United States Patent [19]

Oberkirch et al.

[11] Patent Number: 4,603,738

[45] Date of Patent: Aug. 5, 1986

[54] PROCESS AND MEANS FOR PREVENTING BLOCKAGES OF CRUDE OIL DEPOSITS BY THE FORMATION OF EMULSION DUE TO DEPOSITS OF ASPHALT

[75] Inventors: Wolfgang Oberkirch; Armand de Montigny; Hansjürgen Botsch, all of Leverkusen, Fed. Rep. of Germany

[73] Assignee: Bayer Aktiengesellschaft, Leverkusen, Fed. Rep. of Germany

[21] Appl. No.: 689,756

[22] Filed: Jan. 9, 1985

[30] Foreign Application Priority Data

Jan. 18, 1984 [DE] Fed. Rep. of Germany ....... 3401486

[51] Int. Cl.$^4$ ............................................. E21B 43/16
[52] U.S. Cl. .................................. 166/275; 252/8.554
[58] Field of Search ............................... 166/273–275; 252/8.55 D

[56] References Cited

U.S. PATENT DOCUMENTS 3,364,994  1/1968  Sterrett .

FOREIGN PATENT DOCUMENTS 0025822  7/1980  European Pat. Off. .
2112236  8/1983  United Kingdom .

*Primary Examiner*—Stephen J. Novosad
*Assistant Examiner*—Bruce M. Kisliuk
*Attorney, Agent, or Firm*—Sprung Horn Kramer & Woods

[57] ABSTRACT

In the injection of flood water into crude oil deposits, the improvement which comprises including in the water a polyorganopolysiloxane-polyoxyalkylene block copolymer of the formula $$[R^1Si(OSiR_2)_n]_nZ_{m-1}(OR^2)_{m+2}$$

in which
  R represents an alkyl group having up to 4 carbon atoms,
  $R^1$ represents the substituent R or a phenyl radical,
  $R^2$ represents a group of the formula $$R^3(OCH_2CH_2)_x(OCH_2-\underset{\underset{CH_3}{|}}{CH})_y-$$

Z represents —O— or

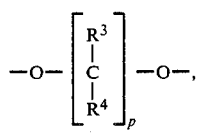

$R^3$ represents a hydrocarbon radical having up to 4 carbon atoms,
  $R^4$ represents hydrogen or a hydrocarbon radical having up to 4 carbon atoms,
  n represents a number from 3 to 30,
  m represents a number from 1 to 15,
  x,y represent numbers which are selected in each case such that when m, n, and p are fixed, the compound is water-soluble, and $y \leq 52$ and x and $x+y \leq 68$,
  $p \geq 2$, but does not exceed the value which makes the compound water-insoluble when m, n, x and y are fixed,
whereby the injection pressure is reduced.

5 Claims, 1 Drawing Figure

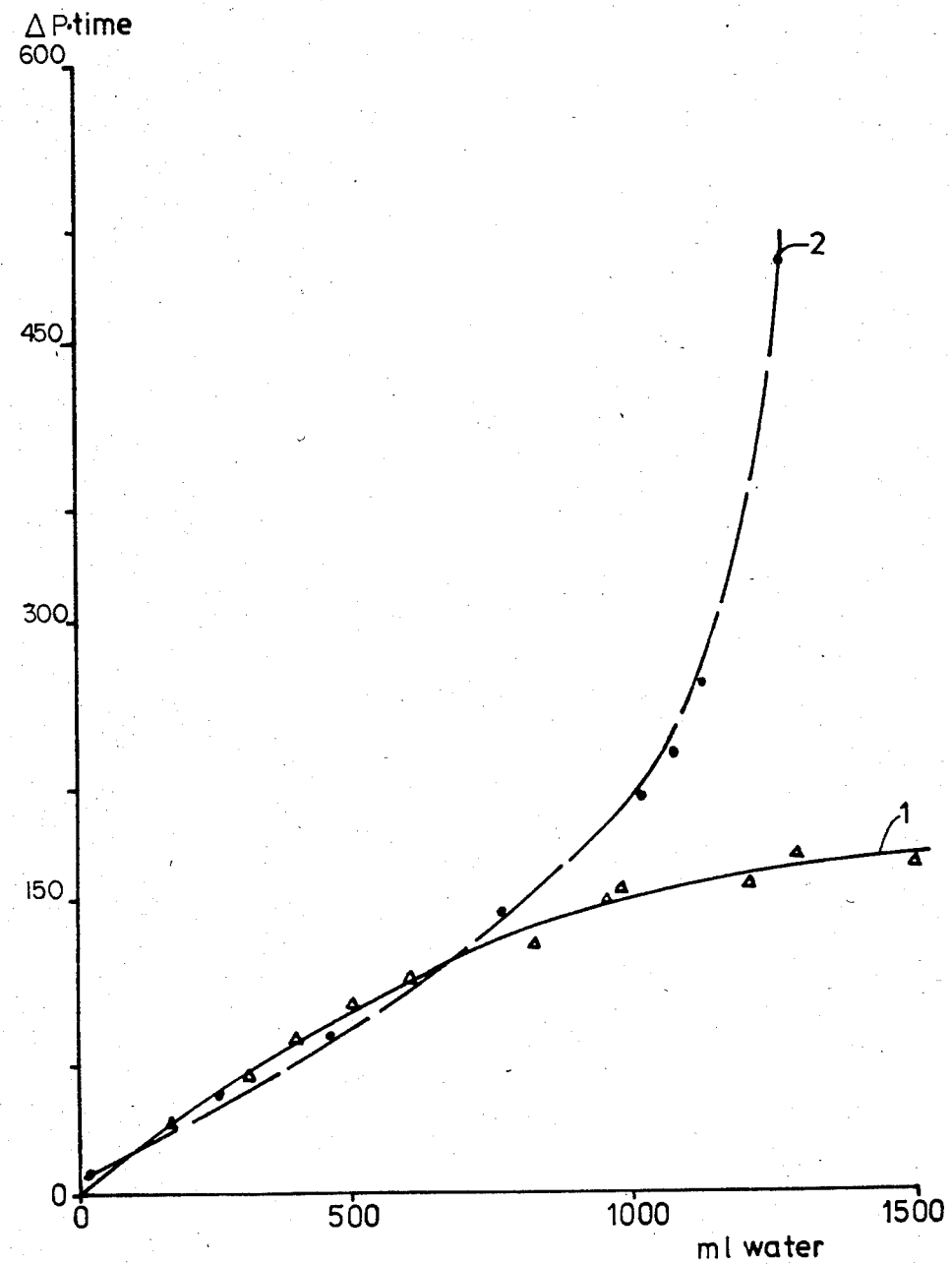

PROCESS AND MEANS FOR PREVENTING BLOCKAGES OF CRUDE OIL DEPOSITS BY THE FORMATION OF EMULSION DUE TO DEPOSITS OF ASPHALT

The present invention relates to a process for preventing blockages of crude oil deposite caused by deposits of asphalt and to a suitable silicone-based means therefor.

In addition to hydrocarbon which is the main constituent, crude oils generally contain varying concentrations of materials which are not hydrocarbons, more particularly sulphur-, oxygen- and nitrogen-containing compounds. The more strongly polar constituents of these oils, unlike the non-polar hydrocarbons, associate with the colloidally dispersed asphalts and crude oil resins. The crude oil is thus a micellar solution. The micellae can separate into flakes on oil-water interfaces and stabilize a water-in oil-emulsion.

It is known that the degree of deoiling can be increased by pressing flood water into the pore space of a deposit (c.f., by way of example, Enhanced Oil Recovery, Edited by M. M. Schumacher, Noyes Data Corp. Park Ridge N.J. 1978, P17–30 and the literature specified therein).

Stable water-in oil emulsions can be formed in asphalt-rich crude oils by injecting flood water into the pore space of the deposit. Due to the higher viscosity thereof, in comparison with the oil and water, the emulsion exhibits resistance to flow so the injection pressure for the flood water has to be increased. This can only be done up to at most the fracture pressure of the rock.

This formation of emulsion generally causes a drop in the injection rate.

The conditioning of flood waters in the production of crude oil using chemicals is known and is regularly used. Oxygen scavengers, bactericides, corrosion inhibitors, scale inhibitors, polyelectrolytes and chelating agents are commonly used and wetting agents are also occasionally used (c.f., by way of example, Chemicals for Oilfield Operations, Edited by J. I. Distasio, Noyes Data Corp. Park Ridge N.J. 1981 and the literature specified therein).

The addition of materials which inhibit the deposition of asphaltenes, thereby preventing the formation of emulsion in the pore space is not known.

It has now been found that certain water-soluble modified polysiloxanes definitely prevent the formation of emulsions which are stabilized by precipitated asphaltenes on the oil-water interface. Water-soluble modified polysiloxanes include polyorganopolysiloxanepolyoxyalkylene block copolymers of the general formula $$[R^1Si(OSiR_2)_n]_m Z_{m-1}(OR^2)_{m+2}$$

in which
R represents an alkyl group having up to 4 carbon atoms,
$R^1$ represents the substituent R or a phenyl radical,
$R^2$ represents a group of the formula

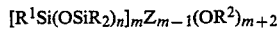

Z represents a bifunctional unit, such as —O— or

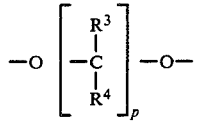

wherein
$R^3$ represents a hydrocarbon radical having up to 4 carbon atoms,
$R^4$ is the same or different and represents a hydrogen atom or $R^3$,
n represents a number from 3 to 30,
m represents a number from 1 to 15,
x and y represents numbers, selected in each case, such that when m, n and p are fixed, the compound is water-soluble (and in the case y being limited to $\leq 52$; x aged $x+y \leq 68$).
$p \geq 2$, but does not exceed the value which makes the above compound water-insoluble when m, n, x and y are fixed.
Advantageously,
m is 1 or 2,
n is a number from 12 to 22,
p is 2 or 3,
x is a number from 12 to 31, and
y is a number from 14 to 28,
and all the $R^2$ moieties in a given molecule are not identical.

The compounds to be used according to the present invention are produced according to known processes described in EP-PS 25 822.

Flood tests with asphaltene-rich crude oil were carried out in sand-packed linear horizontal flood cores to determine the effectiveness of the compounds according to the present invention. The conditions in a deposit were simulated by first saturating the flood core with highly-saline formation water, displacing this formation water up to retained water saturation and then flooding with low-saline water (3% NaCl solution).

A very intense build-up of pressure is observed in tests where the asphaltene-rich crude-oil is flooded without the compounds according to the present invention, thereby necessitating a constant increase of the injection pressure, and the pressure gradient in the flood pipe constantly increases and can be up to about 100 bar/m.

Additives according to the present invention are suitable for preventing the formation of viscous W/O emulsions as are produced when the flood water comes into contact with the asphaltene-rich crude oils in a deposit, and thus also prevent the dreaded build-up of pressure.

Depending on the nature of the crude oil, at least 5 ppm, but preferably from 30 to 100 ppm of additive, based on the quantity of flood water, are required to limit the rise of the pressure gradient to 1 bar/m. This effect is also observed under the temperature and pressure conditions prevalent in an actual deposit, i.e. temperatures of about 90° C. and pressures of up to 200 bars.

The present invention is described in more detail by the following Example, without it limiting the scope thereof, taken in conjunction with the accompanying drawing wherein the figure is a plot of volume of flood water against pressure difference x time.

EXAMPLE

A 1 m long firmly shaken sand-packing of quartz sand, having a grain size of from 0.03 to 0.15 mm and a porosity of 40±2% is saturated with a 3% NaCl solution. This water is subsequently displaced up to retained water saturation by a crude oil having a 12% asphaltene content. This is then flooded with a 3% NaCl solution having a flood velocity of 0.5 m/d, until 1.5 l, the entire quantity of flood water, has been consumed.

According to the present invention, 60 ppm of polyetherpolysiloxane are added to the flood water to prevent an emulsion block, and according to the general formula $$[R^1Si(OSiR_2)_n]_m Z_{m-1}(OR^2)_{m+2}$$

m=1
n=20
R=R$^1$=—CH$_3$ $$R^2 = R^3 \text{(\(OCH_2CH_2\))}_x \text{(\(OCH_2\overset{CH_3}{\underset{|}{CH}}\))}_y$$

R$^3$=C$_4$H$_9$
x=15
y=17

The same test is carried out in a comparative test without the emulsion-preventing additive according to the present invention.

The emulsion-preventing effect can be seen from the figure in which the product of pressure difference over the length of the pipe (1 m)=p and the time is shown as a function of the injected volume of flood water in ml. In the absence of additive, a steeply rising curve is obtained, whereas a flat curve is obtained with the additive.

In the figure, 1 shows the curve for a NaCl solution (3% by weight) and 2 shows the curve for a 3% by weight NaCl solution having 60 ppm of the substance according to the above Example (60 ppm based on the total quantity of injected water).

It will be appreciated that the instant specification and examples are set forth by way of illustration and not limitation, and that various modifications and changes may be made without departing from the spirit and scope of the present invention.

We claim:

1. In the injection of flood water into crude oil deposits, the improvement which comprises including in the water a polyorganopolysiloxane-polyoxyalkylene block copolymer of the formula $$[R^1Si(OSiR_2)_n]_m Z_{m-1}(OR^2)_{m+2}$$

in which
R represents an alkyl group having up to 4 carbon atoms,
R$^1$ represents the substituent R or a phenyl radical,
R$^2$ represents a group of the formula $$R^3(OCH_2CH_2)_x(OCH_2-\overset{CH_3}{\underset{|}{CH}})_y-$$

Z represents —O— or $$-O-\begin{bmatrix} R^3 \\ | \\ C \\ | \\ R^4 \end{bmatrix}_p -O-,$$

R$^3$ represents a hydrocarbon radical having up to 4 carbon atoms,
R$^4$ represents hydrogen or a hydrocarbon radical having up to 4 carbon atoms,
n represents a number from 3 to 30,
m represents a number from 1 to 15,
x, y represent numbers which are selected in each case such that when m, n, and p are fixed, the compound is water-soluble, and y≦52 and x and x+y≦68,
p≧2, but does not exceed the value which makes the compound water-insoluble when m, n, x and y are fixed,
whereby the injection pressure is reduced.

2. A method according to claim 1, wherein
m is 1 or 2,
n is a number from 12 to 22,
p is 2 or 3,
x is a number from 12 to 31, and
y is a number from 14 to 28.

3. A method according to claim 1, wherein all the R$^2$ moieties in a given molecule are not identical.

4. A method according to claim 1, wherein the copolymer is employed in about 5 ppm of the flood water.

5. A method according to claim 1, wherein the copolymer is employed in at least 30 to 100 ppm of the flood water.

* * * * *